I. & G. DIMOCK.
SPRING-BALANCE FOR TESTING SILK, &c.

No. 174,496. Patented March 7, 1876.

Witnesses
John Becker
Fred. Haynes

Ira Dimock
George Dimock
by their Attorneys
Brown & Allen

UNITED STATES PATENT OFFICE.

IRA DIMOCK, OF HARTFORD, AND GEORGE DIMOCK, OF WILLIMANTIC, CONNECTICUT; SAID GEORGE DIMOCK ASSIGNOR TO SAID IRA DIMOCK.

IMPROVEMENT IN SPRING-BALANCES FOR TESTING SILK, &c.

Specification forming part of Letters Patent No. 174,496, dated March 7, 1876; application filed February 16, 1876.

*To all whom it may concern:*

Be it known that we, IRA DIMOCK, of Hartford, in the county of Hartford and State of Connecticut, and GEORGE DIMOCK, of Willimantic, in the county of Windham and State of Connecticut, have jointly invented a new and useful Instrument for Testing the Strength and Purity of Silk and other Threads; and we do hereby declare that the following is a full, clear, and exact description of the same, reference being had to the accompanying drawing, which forms part of this specification.

In cleansing raw silk, preparatory to dyeing, about twenty-five per cent. of gum is removed from the fiber as wound from the cocoons, and it is generally considered by manufacturers and dealers that, in dyeing the cleansed fiber, the weight of gum cleansed away may be restored by the dye without regarding the silk as adulterated more than when in its natural state, the whole strength of the fiber being retained, and the weight after dyeing being the same as that of pure raw uncleansed silk. Silk possessing no more than the original weight after dyeing we will, for convenience, assume to be "pure silk;" but frequent adulterations are made by manufacturers. It is, therefore, very desirable that some convenient and ready means of simultaneously testing the strength and purity of silk should be provided; and this it is primarily the object of our invention to supply. But our invention may be applied to testing the strength of other threads.

Our invention consists in a combination of a ratchet and pawl with the graduated bar of a spring-balance, whereby such graduated bar is held at any point of extension to which it may be drawn out when a test is made. It also consists in the graduated bar of such a spring-balance, such bar having both a scale of weights and a scale of lengths. It also consists in a necked and notched and headed hitching-stud in combination with such graduated bar of the spring-balance, such stud being for the convenient attachment of the threads to be tested.

Figure 1:
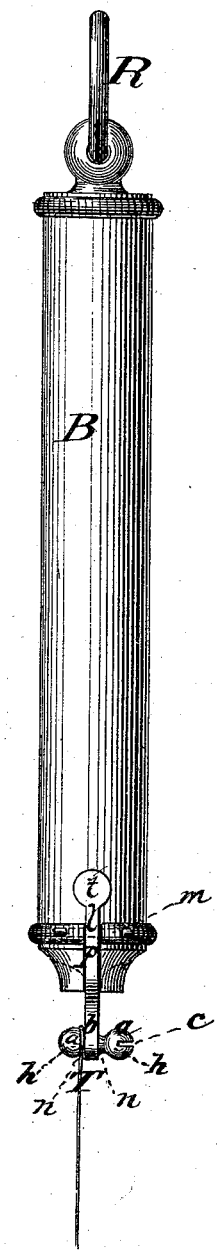
Figure 2:
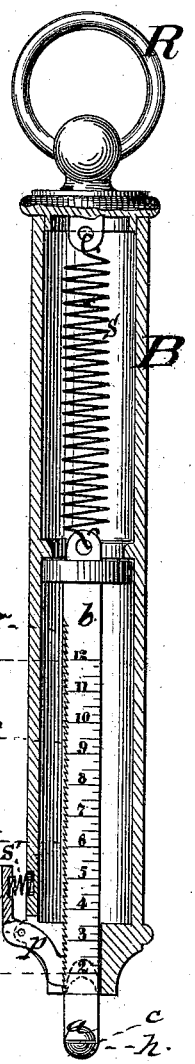
Figure 3:
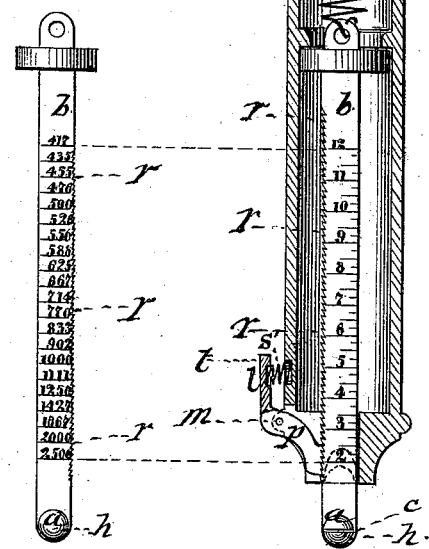
Figure 4:
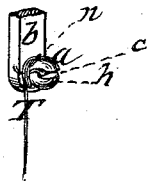

Figure 1 is an exterior view of our instrument for testing the strength and purity of silk and other threads. Fig. 2 is a central and longitudinal section of the same. Fig. 3 is a side view of the graduated bar of the said instrument; and Fig. 4 is a detailed view showing one method of attaching a thread to be tested.

Similar letters of reference refer to like parts in all the figures.

In pure silk there exists an almost constant relation between its strength and the length of any given weight of thread.

Taking one thousand (1,000) yards as the standard of length, and one (1) ounce as the standard of weight for one thousand (1,000) yards, the breaking-strain of a double thread of pure silk possessing the said length and weight should be found to be almost constantly eighty (80) ounces, one-quarter of the weight of the silk (25 per cent.) being dye. In other words, the breaking-strain, in ounces, of a thread of pure silk has a nearly constant ratio to the number of yards per ounce of the said thread; and eighty ounces may be conveniently taken as a fair standard breaking-strain for silk thread weighing one (1) ounce per one thousand (1,000) yards, when broken double, as shown at T, Fig. 1. Length per ounce multiplied by strength will, therefore, give a product which will express the relative value of a silk thread, whether compared to this convenient standard or to any other that may be adopted; but, in the application of our invention, we prefer to adopt eighty (80) ounces as the breaking-strain for a silk thread, tested double, that shall measure one thousand (1,000) yards per ounce.

B, Figs. 1 and 2, represents the spring-balance, having a ring, R, at its upper end, for convenience in holding the instrument during a test. The spring $s$ of the said spring-balance has attached to it, in the usual or in any preferred manner, the graduated bar $b$. On that side of the said graduated bar $b$ shown in Fig. 2 is placed the scale of lengths, preferably indicated in figures denoting the number of yards of pure silk contained in an ounce-weight of various threads which break at various strains indicated on the opposite side of the bar $b$ in the scale of weights.

The scale of weights is shown in Fig. 3, marked on the graduated bar $b$ on the side opposite that shown in Fig. 2. The figures indicate avoirdupois pounds, and the graduation-marks, extending entirely across the bar, therefore include divisions of sixteen ounces, subdivided by shorter graduation-marks into divisions indicating four (4) ounces each, which is found to be sufficiently accurate for practical purposes, although the graduation may be carried to any degree of minuteness desired, and the scale may be constructed according to any other standard. Each of these graduation-marks is placed opposite the graduation-mark on the other side of the graduated bar, which indicates the length of a thread of pure silk weighing one ounce that should break, when tested double, at a strain indicated by the said particular graduation-mark on the said scale of weights. On one edge of the bar $b$ is formed a ratchet, $r$, the teeth of which are engaged by the spring-pawl $p$, pivoted at $m$ to the case of the spring balance, the small coiled spring $s'$ actuating said pawl $p$. Upon the pawl $p$ is formed a lever, $l$, which has formed upon it a thumb-piece, $t$. Pressure upon the thumb-piece $t$ releases the pawl $p$ from its engagement with the ratchet $r$. On that end of the graduated bar $b$ remote from the spring $s$ is fixed a stud or studs, $a$. Each of said studs has a head, $h$, and a neck, $n$, inserted in the end of the said graduated bar $b$. Said stud or studs $a$ have also a notch, $c$, formed in the face of either or both, for the ready and convenient attachment of the thread to be tested.

The instrument is used in the following manner: If a double thread is to be tested, the thread is passed around the neck $n$ of the stud $a$ in the form of a loop, as shown at T, Fig. 1. The instrument is then held in one hand by the ring R, and with the other hand tension is put upon the thread till it breaks. The tension on the thread draws out the graduated bar $b$, which is held by the ratchet $r$ and the pawl $p$ at the point of extension where the thread breaks. By now reading on the scale of weights on one side of the said graduated bar $b$, and then on the scale of lengths on the other side of the said bar $b$, the exact length of a thread of pure silk in one ounce of the same which should break at the strain applied is ascertained. For instance, if thread on a spool containing one thousand yards breaks when tested double at a strain of sixty-four (64) ounces, the spool ought to contain, according to the aforesaid standard, twelve hundred and fifty (1,250) yards of pure silk, and the silk has therefore been overweighted in dyeing. On the other hand, if a double thread of a spool containing one thousand (1,000) yards breaks at a strain of six (6) pounds or ninety-six (96) ounces, it ought to contain of technically pure silk only eight hundred and thirty-three (833) yards, and the weight of gum washed away in cleansing the silk has not been restored in dyeing.

A single thread may be tested, when necessary, by passing the thread T, Fig. 4, through the notch $c$ in the stud $a$, and then winding it once or twice round the neck $n$, which forms a sufficiently secure attachment of the thread to the graduated bar $b$, but when so tested one-half ($\frac{1}{2}$) the number of yards indicated on the said bar will be the number that one ounce of the before-mentioned standard dyed silk should contain.

Instead of placing the scale of lengths and the scale of weights on opposite sides of the bar $b$, they may, if desired, be placed on the same side of the bar.

I claim—

1. The combination of the ratchet $r$ and the pawl $p$ with the graduated bar $b$ of the spring-balance, substantially as herein described.

2. The graduated bar $b$, graduated in weights and lengths, substantially as herein set forth.

3. The necked, headed, and notched hitching stud or studs $a$, in combination with the graduated bar $b$ of the spring-balance, substantially as and for the purpose herein set forth.

IRA DIMOCK.
GEORGE DIMOCK.

Witnesses:
JOHN M. HALL,
HENRY L. HALL.